US008955756B2

(12) United States Patent
Johnson, II et al.

(10) Patent No.: US 8,955,756 B2
(45) Date of Patent: Feb. 17, 2015

(54) SECURITY SYSTEM TAG HAVING COMBINED CLAMP AND ANTENNA

(75) Inventors: William Johnson, II, Lake Worth, FL (US); Thomas Patrick Solaski, Boca Raton, FL (US); Danhui Luo, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 419 days.

(21) Appl. No.: 13/037,843

(22) Filed: Mar. 1, 2011

(65) Prior Publication Data

US 2011/0215156 A1 Sep. 8, 2011

Related U.S. Application Data

(60) Provisional application No. 61/311,237, filed on Mar. 5, 2010.

(51) Int. Cl.
*G06K 19/06* (2006.01)
*H04W 4/02* (2009.01)

(52) U.S. Cl.
CPC ...................................... *H04W 4/02* (2013.01)
USPC ....................................................... 235/492

(58) Field of Classification Search
USPC ........................................................ 235/492
See application file for complete search history.

(56) References Cited

U.S. PATENT DOCUMENTS

| 7,196,670 | B2* | 3/2007 | Chen ............................. 343/702 |
| 2004/0233042 | A1 | 11/2004 | Piccoli et al. |
| 2008/0088460 | A1* | 4/2008 | Copeland ................... 340/572.7 |
| 2009/0167615 | A1* | 7/2009 | Teng et al. .................... 343/702 |
| 2009/0224918 | A1* | 9/2009 | Copeland ................... 340/572.1 |
| 2010/0295694 | A1* | 11/2010 | Kauffman et al. ............ 340/665 |

FOREIGN PATENT DOCUMENTS

WO 2006050407 A1 5/2006

OTHER PUBLICATIONS

International Search Report and Written Opinion dated May 9, 2011 for International Application No. PCT/US2011/000373, International Filing Date: Mar. 1, 2011 consisting of 10-pages.

* cited by examiner

*Primary Examiner* — Michael G Lee
*Assistant Examiner* — David Tardif
(74) *Attorney, Agent, or Firm* — Alan M. Weisberg; Christopher & Weisberg, P.A.

(57) ABSTRACT

A security tag incorporating a hybrid clamp that combines an attachment clamp with an RFID component. The attachment clamp is used to secure an item, such as an article of clothing, to the tag. The RFID component, e.g., an RFID antenna, transmits data signals to an RFID reader where the data signals are encoded with information stored about the security tag. The hybrid clamp combines the attachment features and RFID antenna features of the security tag in one clamp.

20 Claims, 6 Drawing Sheets

SECURITY SYSTEM TAG HAVING COMBINED CLAMP AND ANTENNA

CROSS-REFERENCE TO RELATED APPLICATION

The present invention is related to and claims priority to U.S. Provisional Patent Application No. 61/311,137, entitled APPARATUS, SYSTEMS, AND METHODS FOR REUSABLE VISIBLE SOURCE TAG (VST) WITH RFID, filed Mar. 5, 2010, the entire contents of which is incorporated herein by reference.

STATEMENT REGARDING FEDERALLY SPONSORED RESEARCH OR DEVELOPMENT n/a

FIELD OF THE INVENTION

The present invention relates generally to security tags and more specifically to a radio frequency identification ("RFID") security tag that incorporates the tag clamp with the RFID antenna in a single unit.

BACKGROUND OF THE INVENTION

Radio-frequency identification (RFID) systems are generally known in the art and may be used for a number of applications, such as managing inventory, electronic access control, security systems, and automatic identification of cars on toll roads. An RFID system typically includes an RFID reader and an RFID device. The RFID reader may transmit a radio-frequency carrier signal to the RFID device. The RFID device may respond to the carrier signal with a data signal encoded with information stored by the RFID device.

Electronic article surveillance (EAS) systems are also generally known in the art for the prevention or deterrence of unauthorized removal of articles from a controlled area. In a typical EAS system, EAS markers (known as tags or labels) are designed to interact with an electromagnetic field located at the exits of the controlled area, such as a retail store. These EAS markers are attached to the articles to be protected. If an EAS tag is brought into the electromagnetic field or "interrogation zone," the presence of the tag is detected and appropriate action is taken, such as generating an alarm. For authorized removal of the article, the EAS tag can be deactivated, removed or passed around the electromagnetic field to prevent detection by the EAS system.

EAS systems typically employ either reusable EAS tags or disposable EAS tags or labels to monitor articles to prevent shoplifting and unauthorized removal of articles from the store. The reusable EAS tags are normally removed from the articles before the customer exits the store. The disposable tags or labels are generally attached to the packaging by adhesive or are located inside the packaging. These tags typically remain with the articles and must be deactivated before they are removed from the store by the customer. Deactivation devices may use coils which are energized to generate a magnetic field of sufficient magnitude to render the EAS tag inactive. The deactivated tags are no longer responsive to the incident energy of the EAS system so that an alarm is not triggered.

The market need for combining EAS and RFID functions in the retail environment is rapidly emerging. Many retail stores that now have EAS for shoplifting protection rely on bar code information for inventory control. RFID offers faster and more detailed inventory control over the bar code. Retail stores already pay a considerable amount for hard tags that are re-useable. Adding RFID technology to EAS hard tags could easily pay for the added cost due to improved productivity in inventory control as well as loss prevention.

The design of current RFID security tags and combination EAS/RFID security tags are not without their inherent structural challenges. In current security tags, attachments clamps are used to cooperate with an attachment element, such as a pin, to attach the security tag to an item to be secured (e.g. an article of clothing). FIG. 1 illustrates a prior art security tag 2 having an attachment clamp 4 situated towards one end of tag 2 while the RFID component 6 having an antenna 8 is situated at an opposite end of tag 2. This type of design results in a tag that uses two separate components, one component for RFID capabilities and a separate component used to attach the tag to an article. In this configuration, each is a separate assembly and placed apart from each other within the tag in order to minimize electronic signal interference. This requires special tooling and a larger tag in order to accommodate both components, leading to higher storage and manufacturing costs.

Therefore, what is needed is a security tag that integrates at least some currently disparate tag components in order to optimize interior tag space usage, and to reduce size, manufacturing and tooling costs.

SUMMARY OF THE INVENTION

The present invention advantageously provides a method and system for combining an attachment clamp with an RFID antenna, in a single unit, e.g., a hybrid clamp, for a security tag. The attachment clamp mates with a locking device such as a pin to secure an item, such as an article of clothing, to the tag. The RFID antenna transmits data signals to an RFID reader where the data signals are encoded with information stored about the security tag. By combining the attachment features and RFID features of the security tag in one hybrid clamp, more tag space can be freed up for other components, and/or a smaller tag housing can be utilized in order better optimize interior tag housing space and to reduce size, manufacturing and tooling costs.

In one aspect of the invention, a security tag is provided. The security tag includes a housing and a hybrid clamp disposed within the housing where the hybrid clamp includes a radio frequency identification (RFID) antenna and an attachment clamp. The tag also includes an RFID integrated circuit in electrical contact with the antenna.

In another aspect of the invention, a hybrid clamp for use with a security tag is provided. The hybrid clamp includes a radio frequency identification (RFID) antenna and an attachment clamp.

In yet another aspect of the invention, a security tag is provided where the security tag includes a housing having a first abutment area and a second abutment area, and a hybrid clamp disposed within the housing. The hybrid clamp includes a radio frequency identification (RFID) antenna having a first end region and a second end region, the first end region abuts the first abutment area and the second end region abuts the second abutment area, and an attachment clamp, the attachment clamp including a receiving region for receiving an RFID element.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
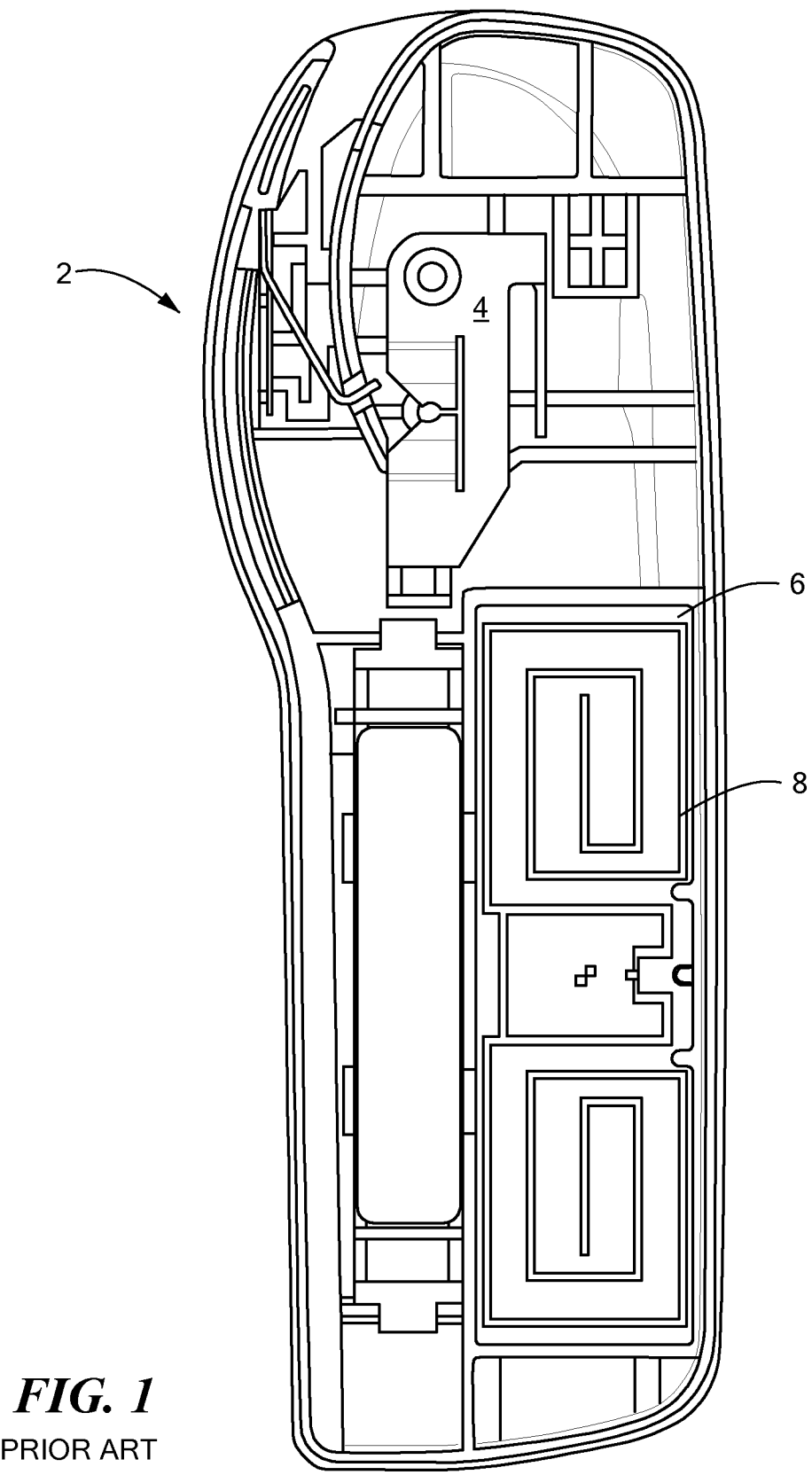
FIG. 1 is a is a top view of the bottom portion of a prior art security tag housing showing a separate attachment clamp and a separate RFID antenna.

Before describing in detail exemplary embodiments that are in accordance with the present invention, it is noted that the embodiments reside primarily in combinations of apparatus components and processing steps related to implementing a security tag that integrates the functions of an attachment clamp mechanism and a radio frequency identification ("RFID") antenna in one device. The present invention is a security tag that combines an attachment clamp that is used in cooperation with an attachment element, such as a pin, to attach the security tag to an item to be secured such as an article of clothing, with an RFID antenna to form a hybrid clamp in order to minimize electronic signal interference and to more efficiently utilize tag interior space.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a hybrid clamp used in a security tag. The hybrid clamp combines an attachment clamp with an RFID component. The attachment clamp is used to secure an item, such as an article of clothing, to the tag. The RFID component includes an RFID antenna to support communication with transmits an RFID reader where the data signals are encoded with information stored about the security tag. By combining the attachment features and RFID features of the security tag in one clamp, more tag space can be freed up for other components, tag size can be decreased and manufacturing cost savings can be realized.

The present disclosure will be understood more fully from the detailed description given below and from the accompanying drawings of particular embodiments of the invention which, however, should not be taken to limit the invention to a specific embodiment but are for explanatory purposes.

Numerous specific details may be set forth herein to provide a thorough understanding of a number of possible embodiments of a security tags and combination EAS/RFID security tags incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Figure 2:
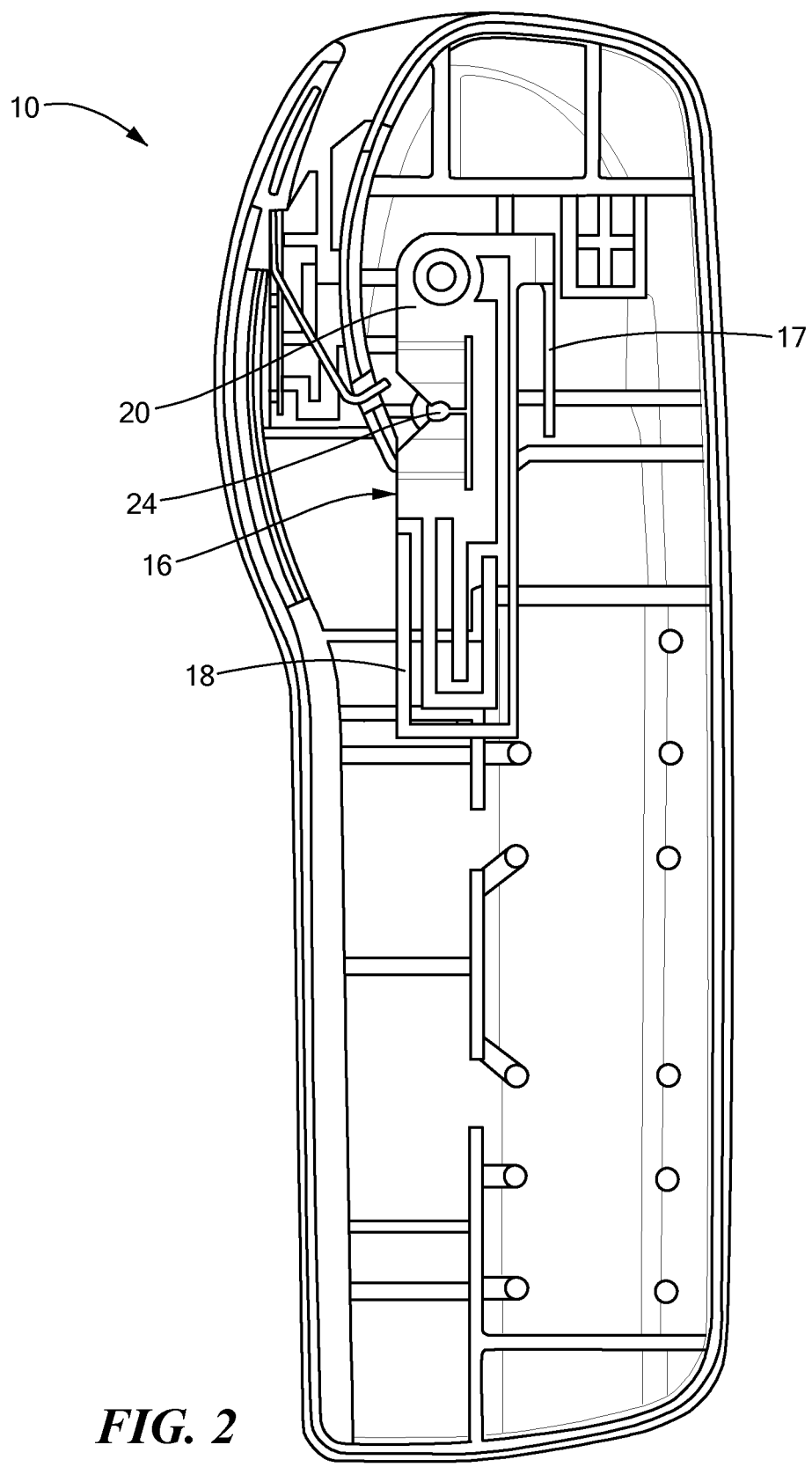
FIG. 2 is a top view of the bottom portion of a security tag housing including a hybrid clamp that combines an attachment clamp and an RFID antenna in one piece in accordance with the principles of the present invention.

Referring now to the drawing figures in which like reference designators refer to like elements, there is shown in FIG. 2 an exemplary configuration of the bottom section of a housing of a security tag 10 according to an embodiment of the present invention. Security tag 10 includes a plurality of chambers to house various components. In one embodiment, tag 10 includes a hybrid clamp 16 contained within a chamber of tag 10. Hybrid clamp 16 includes a tunable RFID antenna 18, and an attachment clamp portion 20. RFID antenna 18 may be tuned to a desired operating frequency by adjusting the length of the antenna. The range of operating frequencies may vary, although the embodiments may be particularly useful for ultra-high frequency (UHF) spectrum. Depending upon the application and the size of the area available for RFID antenna 18, RFID antenna 18 may be tuned within several hundred Megahertz (MHz) or higher, such as 860-960 MHz, for example. In one embodiment, for example, tunable RFID antenna 18 may be tuned to operate within an RFID operating frequency, such as the 868 MHz band used in Europe, the 915 MHz Industrial, Scientific and Medical (ISM) band used in the United States, and the 950 MHz band proposed for Japan. It is again noted that these operating frequencies are given by way of example only, and the embodiments are not limited in this context.

RFID antenna 18 of hybrid clamp 16 may also include, for example, an RFID semiconductor integrated circuit (not shown). The integrated circuit of hybrid clamp 16 may also include memory to store RFID information and which communicates the stored information in response to an interrogation signal transmitted by an RFID reader. RFID information may include any type of information capable of being stored in a memory used by RFID antenna 18. Examples of RFID information include a unique tag identifier, a unique system identifier, an identifier for the monitored object, and so forth. The types and amount of RFID information are not limited in this context.

Hybrid clamp 16 also includes attachment clamp 20. Attachment clamp 20 is typically metal and cooperates with an attachment element, such as a pin, to attach security tag 10 to an item to be secured (e.g. an article of clothing). Advantageously, attachment clamp 20 is part of hybrid clamp 16, along with RFID antenna 18. Attachment clamp 20 and RFID antenna 18 can be formed as a single unit. Because RFID antenna 18 and attachment clamp 20 are a single one piece, i.e., hybrid clamp 16, the relative position of RFID antenna 18 and attachment claim 20 eliminates signal interference between the two components and eliminates any potential parasitic coupling effects. In other words, RFID antenna 18 can be tuned to include the effects of attachment clamp 20. In addition, tag space can better be utilized for other components.

Initially, an article such as a piece of clothing is attached to tag 10 by an attachment element such as a pin, which is retained within an aperture 24. The pin typically pierces the article, thus trapping the article between the pin and attachment clamp 20. Once the article is purchased, a detaching device, such as a tag detacher, is used to remove the pin from within aperture 24. In one embodiment, when the detaching device is inserted within tag 10, it applies lateral force upon hybrid clamp 16 to rotate hybrid clamp 16 thus freeing the attachment element, i.e., pin, from within aperture 24 where the pin had been secured. Hybrid clamp 16 includes a spring 17, which can be fabricated as part of hybrid clamp 16. Spring 17 which can be any type of spring or resilient mechanism such as, for example, a leaf spring facilitates the removal of the attachment element, i.e., a pin. Spring 17 assists in the return of hybrid clamp 16 to its original position after the pin has been removed from aperture 24 by abutting a rib within the housing of tag 10 thus resiliently guiding hybrid clamp 16 back to its original position. It is within the scope of the invention to utilize an attachment clamp 20 that is compatible with different types of detaching devices such as, for example, magnetic and mechanically latched security devices.

Figure 3:
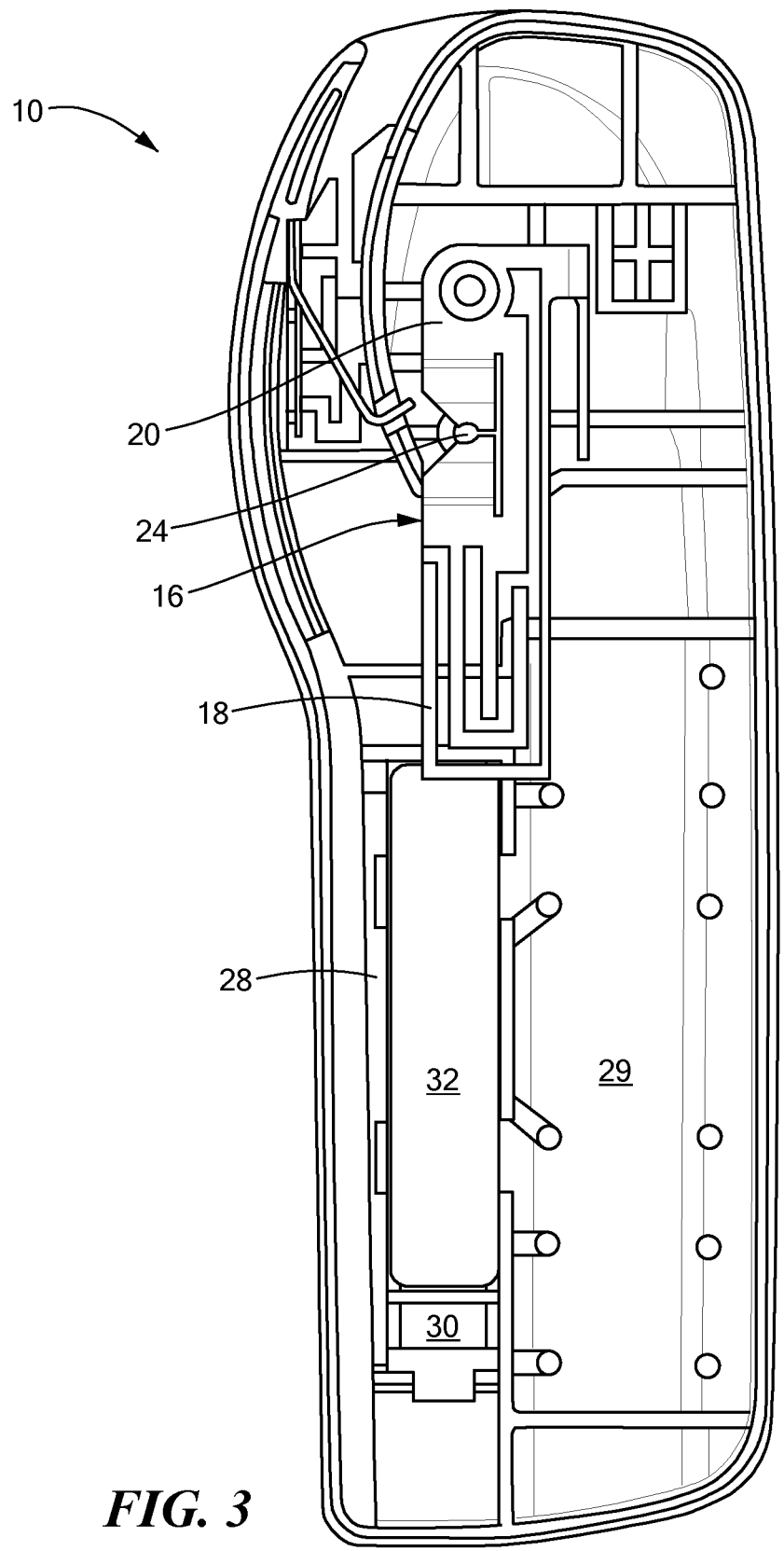
FIG. 3 is a top view of the bottom portion of a combination EAS/RFID security tag housing showing the hybrid clamp that combines an attachment clamp and an RFID antenna in one piece in accordance with the principles of the present invention.

FIG. 3 shows a combination EAS/RFID security tag 10 that includes the components of security tag 10 shown in FIG. 2 along with an EAS component 28. EAS component 28 is an EAS label or tag which may include, for example, but is not limited to, a magnetic resonator element (not shown) situated below a housing spacer 30 made of plastic or some other material, which is situated below a bias magnet 32 (or other EAS type resonant circuits). Other EAS elements not specifically disclosed herein may perform the function of EAS component 28. Thus, hybrid clamp 16 is equally compatible with combination EAS/RFID tags 10 like the one depicted in FIG. 3. It should be noted that space 29 within tag 10 no longer contains an RFID element 18 as shown in the prior art (FIG. 1) and may be utilized for other tag components, or simply eliminated and the size of tag 10 reduced.

Figure 4:
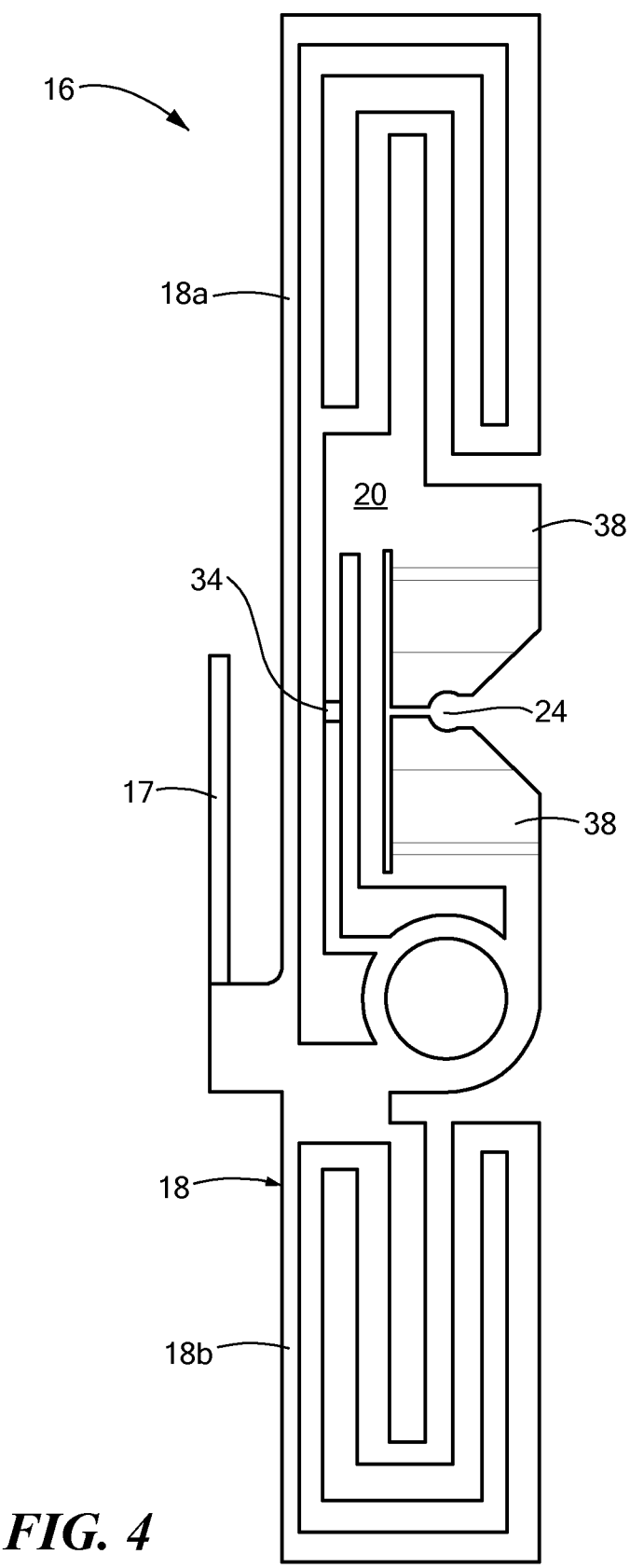
FIG. 4 is a top view illustrating an alternate embodiment of a hybrid clamp constructed in accordance with the principles of the present invention.

FIG. 4 is a top view of an alternate embodiment of hybrid clamp 16. Hybrid clamp 16 includes RFID antenna 18. Attachment clamp 20 includes a pair of jaws 38 surrounding aperture 24, which receives a locking pin, e.g., a pin made of stainless steel, used to affix tag 10 to an article to be protected. In one embodiment, RFID antenna 18 is a dipole antenna surrounding a magnetic loop antenna. The dipole antenna includes two portions shown as 18a and 18b. Between the two portions 18a and 18b is attachment clamp 20. RFID antenna 18 and attachment clamp 20 may be formed from the same material or of different materials and processed and joined together to form one part, i.e., hybrid clamp 16. Hybrid clamp 16 may be made of metal and produced by, for example, metal stamping or any other metal shaping, forming, deposition or removal process. Hybrid claim 16 may also be fabricated from a base metal, e.g., steel, onto which a metal suitable for use as an antenna has been plated. Hybrid clamp 16 also includes an integrated circuit 34, which is electrically connected to RFID antenna 18. RFID antenna 18 is used to send and receive signals to/from integrated circuit 34 and acts to reduce electrostatic discharge ("ESD") damage to integrated circuit 34 by diverting damaging ESD current away from the integrated circuit 34.

RFID antenna 18 of hybrid clamp 16 can be tuned to a merchandise-holding apparatus, e.g., a locking pin, that connects with attachment clamp 20 such that hybrid clamp 16 acts as an "on/off" switch for tag 10. The locking pin can be made of different metal than hybrid clamp 16. When the locking pin is inserted, the combination of the metallic locking pin and RFID antenna 18 are tuned to an operational frequency of RFID integrated circuit 34, e.g., 860-960 MHz. When the locking pin is removed and detached from attachment clamp, RFID antenna 18 is detuned and RFID integrated circuit 34 does not receive a usable signal.

Figure 5:
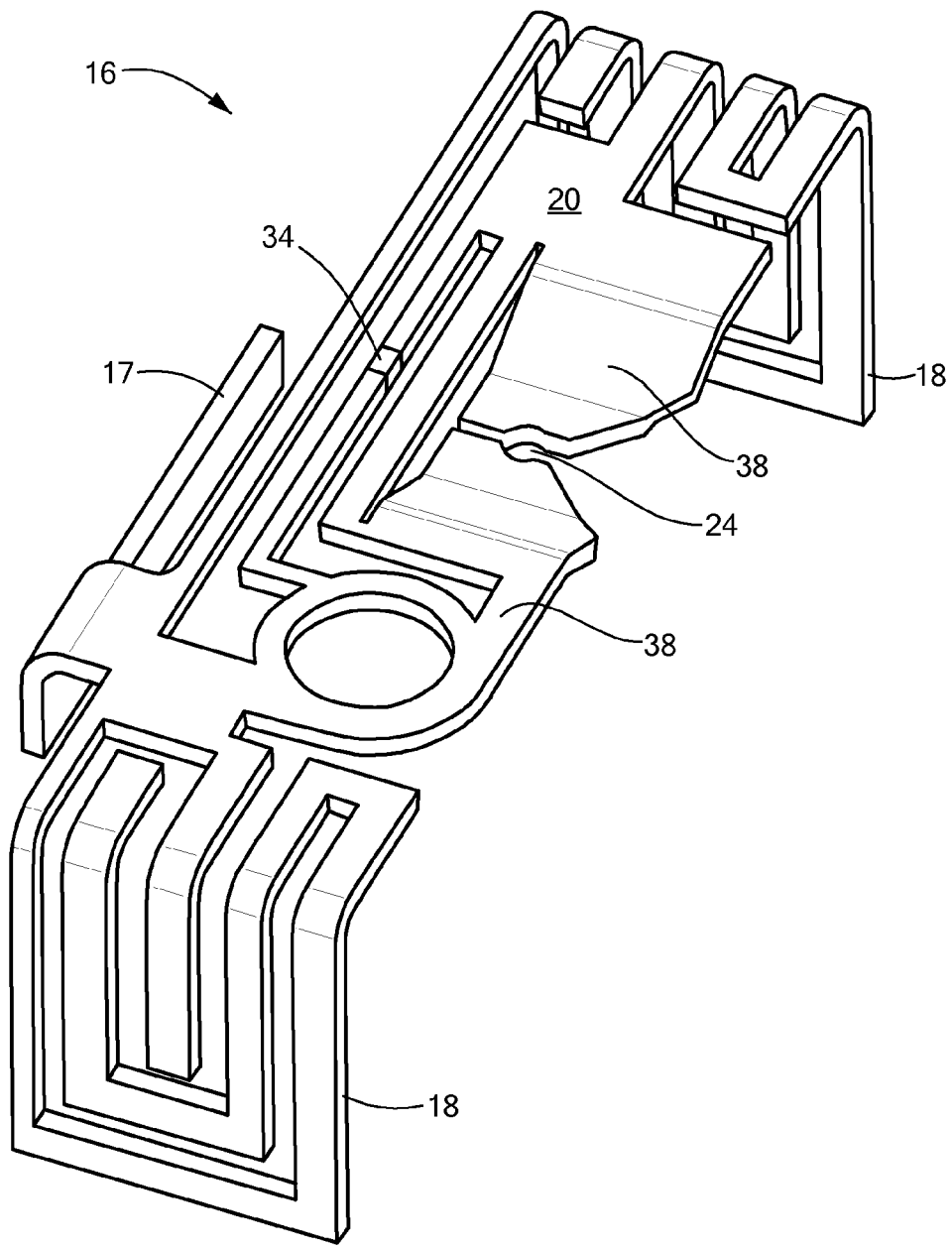
FIG. 5 is a top perspective view of an alternate embodiment of the hybrid clamp of FIG. 4.

FIG. 5 is a top perspective view of an alternate embodiment of the hybrid clamp 16 of FIG. 4. In this embodiment, hybrid clamp 16 is deformable, i.e., RFID antenna 18 is angled or bent with respect to attachment clamp 20. In the embodiment shown in FIG. 5, RFID antenna 18 has two angled portions, one on each side of attachment clamp 20, which is disposed there between. The invention includes the ability to angle or otherwise alter the configuration of one or both portions of RFID antenna 18 depending upon tag design and cost constraints.

By angling or bending one or more portions of RFID antenna 18, RFID antenna 18 is now oriented in two directions, e.g., substantially orthogonal directions, thus altering the overall gain pattern of RFID antenna 18. Further, by providing angled portions of RFID antenna 18, hybrid clamp 16 assumes a smaller footprint thus conserving even more space within tag 10. In addition to saving space within tag 10 by including attachment clamp 20 and RFID antenna 18 on the same device, i.e., hybrid clamp 16, additional space is saved due to the angled portions of RFID antenna 18. It is understood that the housing of tag 10 may have to be altered in certain dimensions in order to accommodate hybrid clamp 16. Additionally, angling portions of RFID antenna 18 allows a larger antenna 18 to be used in hybrid clamp 16. Provided the housing of tag 10 can accommodate the increased depth of hybrid clamp 16, hybrid clamp 16 can incorporate a larger size RFID antenna 18 since housing space is saved due to the angling of RFID antenna 18. In other words, the length of hybrid device 16 remains unchanged but a larger RFID antenna 18 can be employed. The invention is not limited to the angle that RFID antenna 18 can be bent and this can be any angle depending upon design considerations. Further, other embodiments of hybrid clamp 16, i.e., those depicted in FIGS. 2, 3 and 6 may also incorporate angling or bending of one or both portions of RFID antenna 18.

Figure 6:
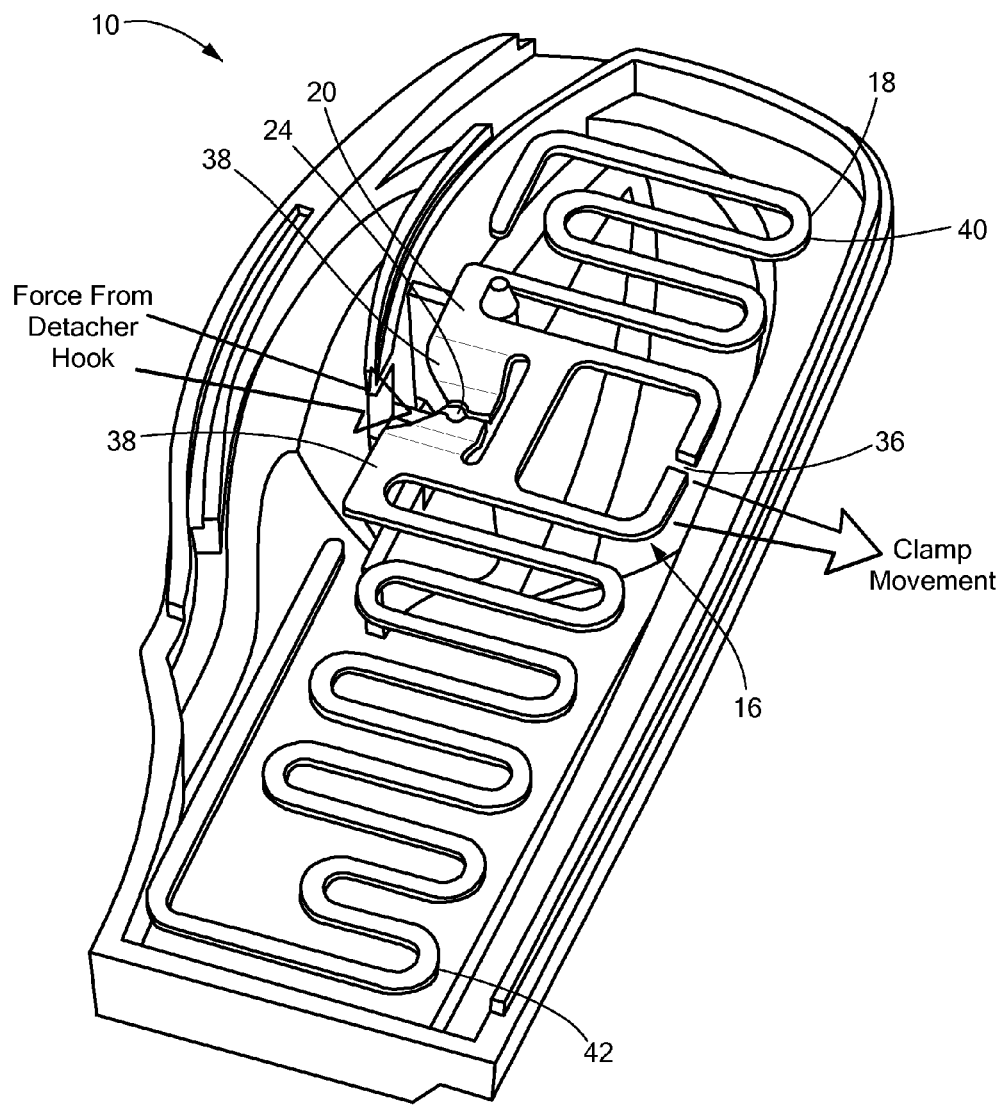
FIG. 6 is a top perspective view of a hybrid clamp combining an attachment clamp and an RFID antenna constructed in accordance with another embodiment of the present invention.

FIG. 6 shows another embodiment of hybrid clamp 16 situated within the housing of tag 10. Hybrid clamp 16 includes attachment clamp 20 and RFID antenna 18. In one embodiment, RFID antenna 18 is a dipole asymmetric antenna sized, along with attachment clamp 20, to fit within the housing of tag 10. Hybrid clamp 16 may also include a region 36 to receive RFID integrated circuit 34 or an RFID strap (not shown) which provides additional RFID functionality by facilitating placement of the RFID integrated circuit within hybrid clamp 16. The RFID strap can be connected to hybrid clamp 16 at region 36 in order to ensure minimum deformation of the RFID strap when attachment clamp 20 is being detached. An RFID strap is used to insert integrated circuit 34 within RFID antenna 18. Of note, although the use of an RFID strap is discussed herein, the invention is not limited to such and other methods of assembling integrated circuit 34 with RFID antenna 18 may be used. RFID integrated circuit 34 and RFID strap are referred to collectively herein as "RFID element".

In one embodiment, RFID antenna 18 is a global band antenna supporting frequencies from 860-960 MHz with a resonant frequency of about 1 GHz. Hybrid clamp 16 can be formed of any material having sufficient mechanical strength to account for the clamping capabilities of attachment clamp 20 while still maintaining sufficient electrical characteristics of RFID antenna 18, such as a metal in the aluminum alloy family, i.e., AL2024-T6, or beryllium copper.

Unlike the embodiments of hybrid clamp 16 depicted in FIGS. 2-4 which, when a detaching device is used to withdraw an attachment element, i.e., a locking pin, from aperture 24, attachment clamp 20 is rotated in order to release the pin and the article to which tag 10 is attached, the hybrid clamp 16 shown in FIG. 6 does not rotate. Instead, the attachment element, e.g., pin, is released in a different manner. Each end region of RFID antenna 18 abuts the interior of the housing of tag 10 at abutment points 40 and 42. It is within the scope of the invention to abut hybrid clamp 16 to the tag housing at other portions of RFID antenna 18 and to other interior portions of the housing of tag 10. Thus, the invention is not limited to the abutment points 40 and 42 shown in FIG. 6.

In operation, the hook of the detaching device is used to exert an inward force to hybrid clamp 16. This force of the detaching device forces attachment clamp 20 inward (the end regions of RFID antenna 18 abut the housing to restrict movement of the end areas of hybrid claim 16), thus allowing jaws 38 to move inward and release the locking pin from within aperture 24. After the detaching device moves jaws 38 and allows removal of the locking pin, RFID antenna 18 acts as a resilient spring and returns back to its original position. Thus, attachment clamp 20 can move from a first position, i.e., before insertion of the detaching device, to a second position, and then back again to the first position. As with all embodiments shown and described herein, the housing of tag 10 shown in FIG. 6 can also receive an EAS element (as described above), thus making tag 10 a combination EAS/RFID security tag.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A security tag, comprising:
    a housing;
    a hybrid clamp disposed within the housing, the hybrid clamp positionable in a first position and a second position, the hybrid clamp configured as:
        a radio frequency identification (RFID) antenna; and
        an attachment clamp, the attachment clamp being configured to releasably mate with an electronic article surveillance (EAS) locking component; and
    an RFID integrated circuit in electrical contact with the hybrid clamp, the RFID integrated circuit configured to operate when the hybrid clamp is in the first position and when the hybrid clamp is in the second position.

2. The security tag of claim 1, wherein the housing further comprises the EAS locking component.

3. The security tag of claim 1, wherein the hybrid clamp is entirely made of a same material.

4. The security tag of claim 3, wherein the RFID antenna comprises:
    a magnetic loop antenna in electrical communication with the RFID integrated circuit; and
    a dipole antenna in electrical communication with the magnetic loop antenna.

5. The security tag of claim 1, wherein at least a portion of hybrid clamp is resiliently deformable.

6. The security tag of claim 5, wherein the RFID antenna is a dipole antenna, the dipole antenna having a first and a second portion, wherein at least one of the first and second portions of the dipole antenna is resiliently deformable.

7. The security tag of claim 1, wherein when the hybrid clamp is electrically coupled to a metallic attachment element, the hybrid clamp is tuned to an operational RFID frequency.

8. A hybrid clamp for use with a security tag, the hybrid clamp configured as:
    a radio frequency identification (RFID) antenna; and
    an attachment clamp, the hybrid clamp positionable between a first and a second position, the security tag configured to operate when the hybrid clamp is in the first position and when the hybrid claim is in the second position, the attachment clamp being configured to releasably mate with an electronic article surveillance (EAS) locking component.

9. The hybrid clamp of claim 8, further comprising an RFID integrated circuit in electrical contact with the hybrid clamp.

10. The hybrid clamp of claim 8, wherein the RFID antenna comprises:
    a magnetic loop antenna in electrical communication with the RFID integrated circuit; and
    a dipole antenna in electrical communication with the magnetic loop antenna.

11. The hybrid clamp of claim 8, wherein at least a portion of the hybrid clamp is resiliently deformable.

12. The hybrid clamp of claim 10, the dipole antenna having a first and a second portion, wherein at least one of the first and second portions of the dipole antenna is resiliently deformable.

13. A security tag, comprising:
    a housing having a first abutment area and a second abutment area;
    a hybrid clamp disposed within the housing, the hybrid clamp positionable in a first position and a second position, the hybrid clamp configured as:
        a radio frequency identification (RFID) antenna having a first end region and a second end region, the first end region abuts the first abutment area and the second end region abuts the second abutment area; and
        an attachment clamp, the hybrid clamp including a receiving region for receiving an RFID element, the RFID element configured to operate when the hybrid clamp is in the first position and when the hybrid claim is in the second position, the attachment clamp being configured to releasably mate with an electronic article surveillance (EAS) locking component.

14. The security tag of claim 13, wherein the hybrid clamp is movable within the security tag between the first position prior to insertion of a detaching device, and the second position after insertion of the detaching device.

15. The security tag of claim 14, the hybrid clamp returning to the first position after removal of the detaching device.

16. The security tag of claim 13, wherein the housing further comprises the EAS component.

17. The security tag of claim 13, wherein when the hybrid clamp is electrically coupled to a metallic attachment element, the hybrid clamp is tuned to an operational RFID frequency.

18. The security tag of claim 13, wherein the hybrid clamp is beryllium copper.

19. The security tag of claim 13, wherein the hybrid clamp is formed as a single unit.

20. The security tag of claim 13, wherein the hybrid clamp is entirely made of a same material.

* * * * *